US011044687B2

(12) United States Patent
Cheng et al.

(10) Patent No.: US 11,044,687 B2
(45) Date of Patent: Jun. 22, 2021

(54) CONFIGURATION SYNCHRONIZATION METHOD AND MESH NETWORK SYSTEM

(71) Applicant: Wistron NeWeb Corporation, Hsinchu (TW)

(72) Inventors: Chui-Chu Cheng, Hsinchu (TW); Ying-Chuan Chen, Hsinchu (TW); Chia-Yi Lien, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 0 days.

(21) Appl. No.: 16/840,466

(22) Filed: Apr. 6, 2020

(65) Prior Publication Data
US 2021/0014803 A1    Jan. 14, 2021

(30) Foreign Application Priority Data

Jul. 9, 2019 (TW) .................................. 108124038

(51) Int. Cl.
*H04W 56/00* (2009.01)
*H04L 12/24* (2006.01)

(52) U.S. Cl.
CPC ....... *H04W 56/001* (2013.01); *H04L 41/0813* (2013.01)

(58) Field of Classification Search
CPC ............. H04W 56/001; H04L 41/0813; H04L 41/0873; H04L 41/085; H04L 41/0816
See application file for complete search history.

(56) References Cited

U.S. PATENT DOCUMENTS

| 10,033,539 | B1 * | 7/2018 | Nagarajan | H04L 12/185 |
| 10,333,611 | B2 * | 6/2019 | Otsu | H04B 7/14 |
| 10,491,657 | B2 * | 11/2019 | Liu | H04L 67/06 |
| 10,986,600 | B1 * | 4/2021 | Chu | H04W 4/023 |
| 2006/0133409 | A1 * | 6/2006 | Prakash | H04W 28/18 370/450 |
| 2008/0112363 | A1 | 5/2008 | Rahman | |
| 2015/0312780 | A1 * | 10/2015 | Wang | H04W 52/0209 370/329 |
| 2016/0337185 | A1 * | 11/2016 | Hardison | H04L 61/2514 |
| 2017/0223710 | A1 * | 8/2017 | Cariou | H04W 52/247 |
| 2018/0007721 | A1 * | 1/2018 | Fu | H04W 24/02 |
| 2018/0248803 | A1 * | 8/2018 | Nagarajan | H04L 47/18 |

FOREIGN PATENT DOCUMENTS

CN      103167535 B     10/2015

* cited by examiner

Primary Examiner — Harry H Kim
(74) Attorney, Agent, or Firm — Winston Hsu (57) ABSTRACT

A configuration synchronization method includes a first extender network device transmitting an extender configuration version to a root network device; the root network device determining whether the extender configuration version is the same as a second root configuration version currently owned by the root network device; and when the extender configuration version is different from the second root configuration version, the root network device transmitting the second root configuration version and a plurality of root network configurations corresponding to the second root configuration version to the first extender network device; a first extender network device updating a plurality of extender network configurations thereof to be the plurality of root network configurations, and updating the extender configuration version thereof to be the second root configuration version.

14 Claims, 4 Drawing Sheets

CONFIGURATION SYNCHRONIZATION METHOD AND MESH NETWORK SYSTEM

BACKGROUND OF THE INVENTION

1. Field of the Invention

The present invention relates to a configuration synchronization method and a mesh network system, and more particularly, an efficient configuration-value-synchronized configuration synchronization method to mesh network system.

2. Description of the Prior Art

WiFi has become a widespread network application technology, and people generally use wireless devices such as wireless access points (hereinafter referred to as AP) to connect or access the Internet. In order to make the network service free of blind spots, the AP and AP will be automatically connected to each other, such that the coverage will be extended by cooperation between APs in the prior art, which is called mesh network in which a user may connect to the suitable AP according to the environment. In order to make the mesh network function normally, the configuration (such as SSID, Key, Access Control List, QoS, and etc.) of each AP needs synchronized to each other to cooperation smoothly.

In addition, the network by which the APs connected may suffer from unpredictable situations, such as the network disconnects by environmental interference; the signal is too weak to connect; some APs are temporarily shut down, and the AP adds to the mesh network. In these unpredictable situations, it may apply new settings to some APs, and some APs stills retain the old settings, resulting in inconsistent operation, even if disconnected to the network.

Therefore, it is necessary to improve the prior art.

SUMMARY OF THE INVENTION

It is, therefore, a primary objective of the present invention to provide an efficient configuration synchronization method and the mesh network system, to improve over disadvantages of the prior art.

An embodiment of the present invention discloses a configuration synchronization method, applied to a mesh network system, wherein the mesh network system comprises the first extender network device of the at least one extender network device has a plurality of extender network configuration values, the configuration synchronization method comprising: the first extender network device transmitting an extender configuration version number to the root network device; the root network device determining whether the extender configuration version number is the same as a second root configuration version number currently owned by the root network device; and when the root network device determines that the extender configuration version number is different from the second root configuration version number, the root network device transmitting the second root configuration version number and the plurality of root network configuration values corresponding to the second root configuration version number to the first extender network device; the first extender network device updating the extender network configuration value thereof according to the plurality of root network configuration values corresponding to the second root configuration version number, so as to make the plurality of extender network configuration values be the same as the plurality of root network configuration values; and the first extender network device updating the extender configuration version number to be the second root configuration version number.

An embodiment of the present invention further discloses a mesh network system, comprising at least one extender network device, having a plurality of extender network configuration values; a root network device, having a plurality of root network configuration values; wherein the mesh network system is configured to perform the following steps: a first extender network device transmitting an extender configuration version number to the root network device; the root network device comparing whether the extender configuration version number is the same as the second root configuration version number owned currently by the root network device; and when the root network device determines that the extender configuration version number is different from the second root configuration version number, the root network device transmitting the second root configuration version number and the plurality of root network configuration values corresponding to the second root configuration version number to the first extender network device; the first extender network device updating the extender network configuration value thereof according to the plurality of root network configuration values corresponding to the second root configuration version number, so as to make the plurality of extender network configuration values be the same as the plurality of root network configuration values; and the first extender network device updating the extender configuration version number to be the second root configuration version number.

These and other objectives of the present invention will no doubt become obvious to those of ordinary skill in the art after reading the following detailed description of the preferred embodiment that is illustrated in the various figures and drawings.

DETAILED DESCRIPTION

When a "value", "first value" or "second value" are mentioned below in the following descriptions and claims, the "value" (denoted by aa) generally representing the "first value" (denoted by aa_1) or the "second value" (denoted by aa_2), on the other hand, the "first value (aa_1)" and the "second value (aa_2)" representing the "value (aa)" in special condition or criterion. For example, in the following descriptions and claims, a "root network configuration values (ncv_rt)" generally represents a "first root network configuration values (ncv_rt_1)" and a "second root network configuration values (ncv_rt_2)", the "first root network configuration values (ncv_rt_1)" and the "second root network configuration values (ncv_rt_2)" may represent the "root network configuration values (ncv_rt)" in some condition or criterion.

Generally speaking, a mesh network system comprises a plurality of network devices, which are used to form a mesh network, wherein the network devices can be a wireless access point or wireless router. The operation in the mesh network is controlled by a primary network device, which is one of the plurality of network devices. The primary network device is called a root network device, and another network device is called an extender network device.

Figure 1:
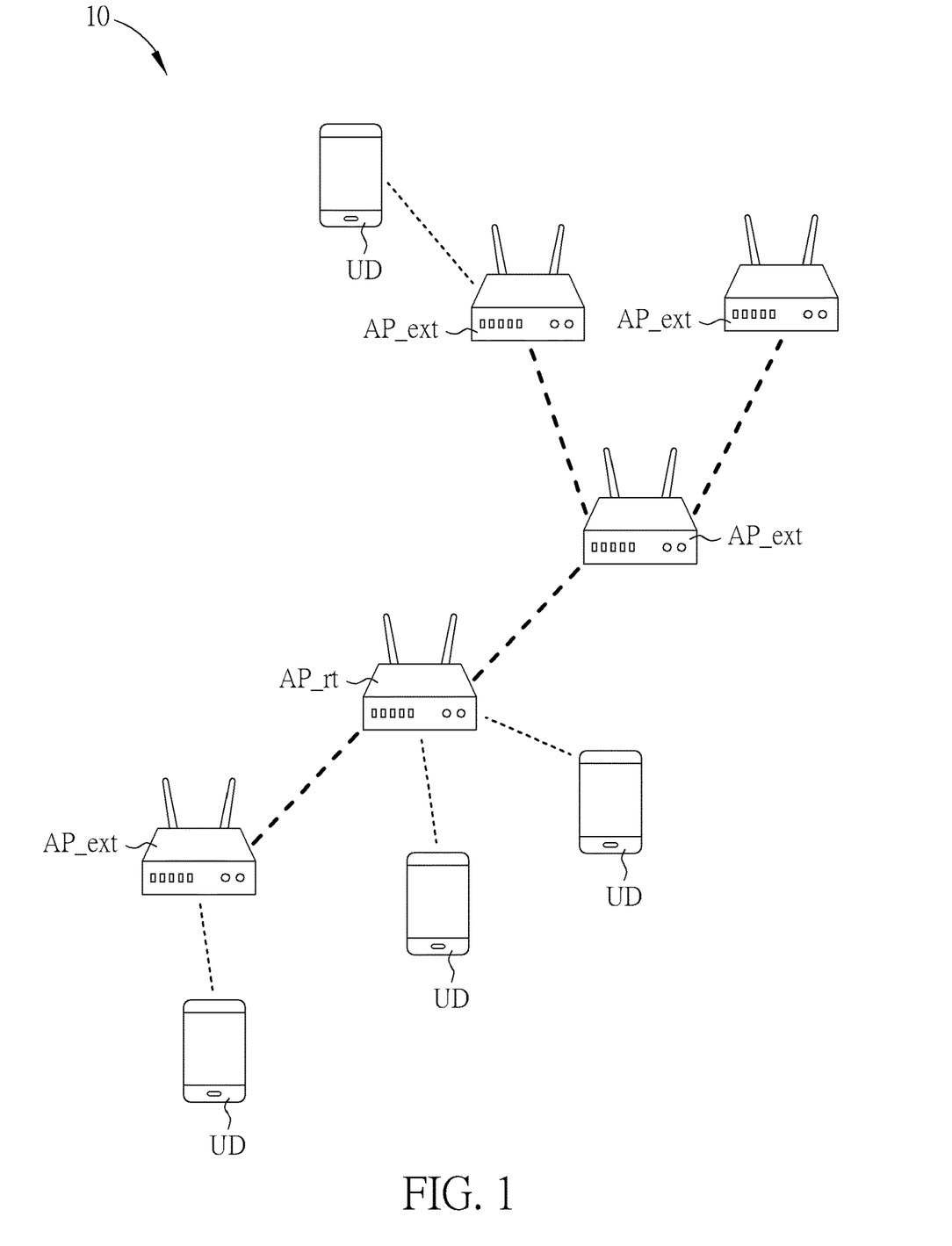
FIG. 1 is a schematic diagram of a mesh network system according to an embodiment of the present invention.

FIG. 1 is a schematic diagram of a mesh network system 10 in an embodiment of the present invention. The mesh network system 10 is a wireless local area network (WLAN), which comprises a root network device AP_rt and a plurality of extender network devices AP_ext. A user device UD can find a network device suitable for (or the best signal quality) according to its environment (or signal quality). The network topology of the network between the root network device AP_rt and the plurality of extender network devices AP_ext is not limited. For example, the network topology can be a daisy chaining, a star, or a hybrid of the above two, which is a tree. The root network device AP_rt and the extender network devices AP_ext store a plurality of network configuration values ncv, to make the mesh network function normally. Each network configuration values ncv in the network devices should be synchronized or consistent, wherein the network configuration values may be a service set identifier (SSID), a key, an access control list (ACL), and quality of service (QoS), and not limited thereto.

In the following descriptions and claims, the network configuration values ncv stored in the root network device AP_rt are called a root network configuration values ncv_rt, and the network configuration values ncv stored in the extender network device AP_ext are called an extender network configuration values ncv_ext. Therefore, the root network device AP_rt stores the plurality of root network configuration values ncv_rt, and the extender network device AP_ext stores the plurality of extender network configuration values ncv_ext.

Figure 2:
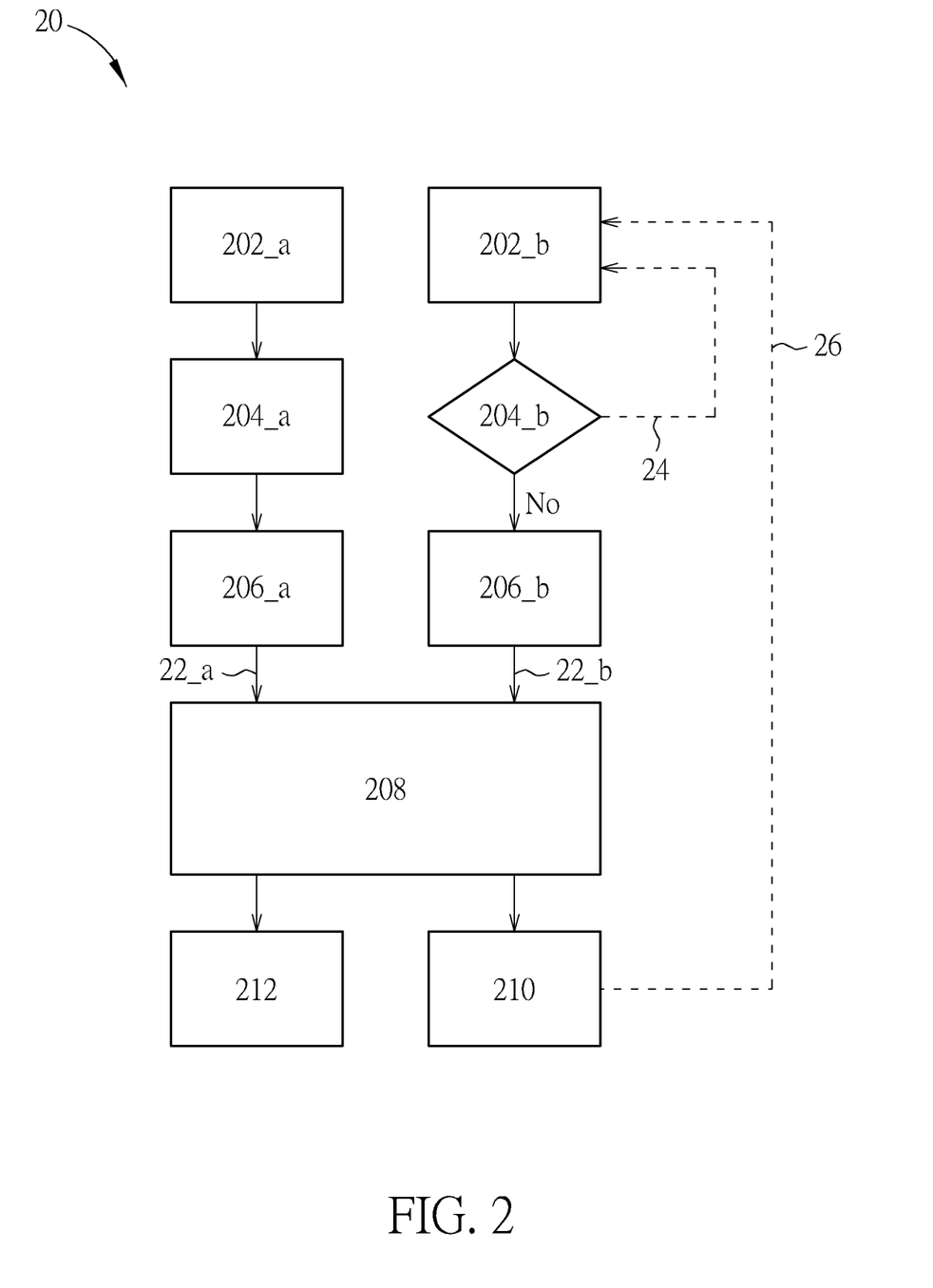
FIG. 2 is a schematic diagram of a configuration synchronization process according to an embodiment of the present invention.

FIG. 2 is a schematic diagram of a configuration synchronization process 20 according to an embodiment of the present invention. The mesh network system 10 can execute the configuration synchronization process 20, so as to make the network configuration values of each network device in the mesh network system 10 are the same. The configuration synchronization process 20 mainly uses a configuration version number cvno to generate a seed of version-updating for updating the network configuration values in the plurality of network devices and trigger the (plurality of) extender network device(s) to update the network configuration values thereof by updating the configuration version number. Moreover, once the network configuration values are updated or re-written, the configuration version number cvno will be also updated simultaneously. Similarly, the configuration version number stored in the root network device AP_rt is called a root configuration version number cvno_rt, and the configuration version number stored in the extender network device AP_ext is called an extender configuration version number cvno_ext. As shown in FIG. 2, the configuration synchronization process 20 comprises the following steps:

Step 202_a: A root network device AP_rt receives a first root network configuration value ncv_rt_1 inputted by a user via interface.

Step 204_a: The root network device AP_rt generates a first root configuration version number cvno_rt_1.

Step 206_a: The root network device AP_rt transmits the first root network configuration value ncv_rt_1 and the first root configuration version number cvno_rt_1 to the extender network device AP_ext.

Step 202_b: A first extender network device AP_ext_1 transmits the extender configuration version number cvno_ext to the root network device AP_rt.

Step 204_b: The root network device AP_rt determines whether the extender configuration version number cvno_ext is the same as a second root configuration version number cvno_rt_2 currently owned by the root network device AP_rt. If not, go to Step 206_b.

Step 206_b: The root network device AP_rt transmits the second root configuration version number cvno_rt_2 and a plurality of root network configuration values ncv_rt_2 corresponding to the second root configuration version number cvno_rt_2 to the first extender network device AP_ext_1.

Step 208: The first extender network device AP_ext_1 updates the extender network configuration value ncv_ext thereof according to the root network configuration value ncv_rt transmitted by the root network device AP_rt, so as to make the plurality of extender network configuration values ncv_ext be the same as the plurality of root network configuration values ncv_rt.

Step 210: The first extender network device AP_ext_1 updates the extender configuration version number cvno_ext to be the root configuration version number cvno_rt according to the root configuration version number cvno_rt transmitted by the root network device AP_rt.

Step 212: The first extender network device AP_ext_1 executes at least one action required for making the updated the plurality of extender network configuration values ncv_ext be effective.

In Steps 202_a-206_a, the root network device AP_rt can receive at least one of the first root network configuration values ncv_rt_1 inputted by a user via an interface. After the root network device AP_rt storing the first root network configuration value ncv_rt_1 (i.e., at a "first time"), the root network device AP_rt generates the first root configuration version number cvno_rt_1, then transmits the first root network configuration value ncv_rt_1 inputted by the user and the first root configuration version number cvno_rt_1 to all of the extender network devices AP_ext.

In an embodiment, the interface can be a graphical user interface (GUI), comprising a user-input field and a button (e.g., a "save" button or an "apply" button) that is used to check the network configuration values. When the user presses the save button or the apply button, the mesh network system 10 goes to Step 202_a to initiate the following a series of steps or initiates the configuration synchronization process 20. The first time is corresponding to the time of the network configuration values updated or changed by the user actively.

For illustrative purpose, the following would take one of the first extender network devices AP_ext_1 of the plurality of extender network devices AP_ext as an example.

In Step 208, the first extender network device AP_ext_1 updates the extender network configuration values ncv_ext of the first extender network device AP_ext_1 according to the root network configuration values ncv_rt transmitted by the root network device AP_rt, so as to make the plurality of extender network configuration values ncv_ext of the first extender network device AP_ext_1 be the same as the root network configuration values ncv_rt. Moreover, the root network configuration values ncv_rt stated in Step 208 may comprise the first root network configuration values ncv_rt_1 stated in Step 206_a, or comprise the plurality of root network configuration values ncv_rt_2 (will be described later on) corresponding to the second root configuration version number cvno_rt_2 stated in Step 206_b.

When the mesh network system 10 goes to Step 208 via a path 22_a, (in Step 208,) the first extender network device AP_ext_1 updates at least one of the extender network configuration values ncv_ext thereof (i.e., of the first extender network device AP_ext_1) according to the first root network configuration value ncv_rt_1, so as to make each of the extender network configuration values ncv_ext stored in the first extender network device AP_ext_1 be the same as each of the root network configuration values ncv_rt stored in the root network device AP_rt at the first time.

When the first extender network device AP_ext_1 updates the extender network configuration values ncv_ext thereof according to the first root network configuration value ncv_rt_1, the first extender network device AP_ext_1 updates the extender configuration version number cvno_ext to be the first root configuration version number cvno_rt_1 in Step 210. That is, the first extender network device AP_ext_1 sets cvno_ext to be cvno_rt_1, i.e., cvno_ext=cvno_rt_1.

In another perspective, no matter what the extender configuration version number cvno_ext stored in the first extender network device AP_ext_1 is, in Step 202_b, the first extender network device AP_ext_1 would send the extender configuration version number cvno_ext stored by itself back to the root network device AP_rt periodically or non-periodically.

Generally speaking, the network devices in the mesh network system 10 would periodically exchange network connection information to each other, to make the mesh network function normally. In other words, the extender network device AP_ext may periodically transmit a packet with connection-related information (such as topology information) to the root network device AP_rt. In an embodiment, the extender network device AP_ext may transmit the packet with topology information to the root network device AP_rt every 6-7 seconds, and the first extender network device AP_ext_1 may attach the extender configuration version number cvno_ext within the packet with connection-related information to transmit it to the root network device AP_rt in Step 202_b.

In Step 204_b, the root network device AP_rt determines whether the extender configuration version number cvno_ext transmitted by the first extender network device AP_ext_1 is the same as the second root configuration version number cvno_rt_2 currently owned by the root network device AP_rt.

Supposed that the root network device AP_rt receives the extender configuration version number cvno_ext stored in the first extender network device AP_ext_1 at a second time, if there is no user makes a new setting to network configuration value via the interface between the first time and the second time, and the root configuration version number cvno_rt of the root network device AP_rt is not updated, the second root configuration version number cvno_rt_2 corresponding to the second time should be the same as the first root configuration version number cvno_rt_1 corresponding to the first time. Otherwise, if a user makes a new setting to the network configuration value via the interface between the first time and the second time and the root configuration version number cvno_rt of the root network device AP_rt is updated, the second root configuration version number cvno_rt_2 corresponding to the second time should be the different from the first root configuration version number cvno_rt_1 corresponding to the first time. In other words, the second root configuration version number cvno_rt_2 represents the root configuration version number cvno_rt stored in the root network device AP_rt at the second time, while the second time is the time that the root network device AP_rt receives the extender configuration version number cvno_ext transmitted from the first extender network device AP_ext_1.

When the root network device AP_rt determines that the extender configuration version number cvno_ext is the same as the second root configuration version number cvno_rt_2 in Step 204_b, the root network device AP_rt would not execute the action and wait for the extender configuration version number cvno_ext transmitted by the first extender network device AP_ext_1 next time, it could be deemed that the mesh network system 10 goes back to Step 202_b (via a path 24), and again the first extender network device AP_ext_1 transmits the extender configuration version number cvno_ext stored by itself to the root network device AP_rt, periodically or non-periodically.

When the root network device AP_rt in Step 204_b determines that the extender configuration version number cvno_ext is different from the second root configuration version number cvno_rt_2, in Step 206_b, the root network device AP_rt transmits the second root configuration version number cvno_rt_2 and the plurality of the root network configuration values ncv_rt_2 corresponding to the second root configuration version number cvno_rt_2 to the first extender network device AP_ext_1, wherein the plurality of the root network configuration values ncv_rt_2 can be the plurality of the root network configuration values ncv_rt stored in the root network device AP_rt at the second time.

Similarly, the first extender network device AP_ext_1 can attach the second root configuration version number cvno_rt_2 within the packet within the connection-related information (such as topology information) to transmit it to the root network device AP_rt.

In an embodiment, the root network device AP_rt only determines whether the extender configuration version number cvno_ext is the same as the second root configuration version number cvno_rt_2, but does not need to individually compare whether the root network configuration value ncv_rt is the same as the extender network configuration value ncv_ext in Step 204_b. Once the root network device AP_rt determines that the extender configuration version number cvno_ext is different from the second root configuration version number cvno_rt_2 in Step 204_b, the root network device AP_rt transmits the plurality of the root network configuration values (ncv_rt_2) owned by itself to the first extender network device AP_ext_1, so as to make the first extender network device AP_ext_1 executing individually comparing and updating the network configuration values (i.e, Step 208).

When the mesh network system 10 goes via a path 22_b to Step 208, in Step 208, the first extender network device AP_ext_1 updates at least one of the extender network configuration values ncv_ext stored by itself according to the plurality of root network configuration values ncv_rt corresponding to the second root configuration version number cvno_rt_2, so as to make each of the extender network configuration values ncv_ext stored in the first extender network device AP_ext_1 be the same as each of the root network configuration values ncv_rt stored in the root network device AP_rt at the second time.

At this time, the mesh network system 10 goes to Step 210 again. In Step 210, the first extender network device AP_ext_1 updates the extender configuration version number cvno_ext to be the second root configuration version number cvno_rt_2. That is, the first extender network device AP_ext_1 sets cvno_ext be cvno_rt_2, i.e., cvno_ext=cvno_rt_2.

Moreover, since the first extender network device AP_ext_1 would send the extender configuration version number cvno_ext stored by itself back to the root network device AP_rt periodically or non-periodically, the mesh network system 10 can be deemed to go back to Step 202_b (via a path 26).

For some of the network configuration values, the first extender network device AP_ext_1 updates the network configuration values directly without executing other actions. In this situation, the mesh network system 10 does not go to Step 212.

In another perspective, for some of the network configuration values, when the first extender network device AP_ext_1 updates the network configuration values, some of the related actions are needed to be executed simultaneously. In this situation, the mesh network system 10 needs to execute Step 212. In Step 212, the first extender network device AP_ext_1 executes at least one action ACT required for making the updated plurality of extender network configuration values ncv_ext be effective. The action ACT generally refers to actions such as reloading the software and/or hardware of the extender network device, re-initiating, or even rebooting, usually executed after the network configuration values are updated, such that the updated network configuration values would be effective. The extender network device of the present invention may determine the scope involved in the actions and reduce the unavailable time in which the wireless service is not provided due to executing the actions ACT.

In an embodiment, the first extender network device AP_ext_1 may individually compare whether the plurality of extender network configuration values ncv_ext are the same as the plurality of root network configuration values ncv_rt. When the first extender network device AP_ext_1 determines that the root network configuration value ncv_rt' is different from the extender network configuration value ncv_ext' corresponding to the root network configuration value ncv_rt', the first extender network device AP_ext_1 updates the extender network configuration values ncv_ext' to be the root network configuration values ncv_rt', and obtains an action flag af' corresponding to updating the extender network configuration value ncv_ext', wherein the action flag af' is corresponding to an action ACT' required for making the updated extender network configuration values ncv_ext' effective, and the action flag af' is used to determine the scope involved in the action ACT' in Step 208. Therefore, in Step 212, the first extender network device AP_ext_1 can execute the action ACT' required for making the updated extender network configuration values ncv_ext' effective depending on the action flag af', so as to make the updated extender network configuration value ncv_ext' effective.

Generally speaking, in order to make the updated extender network configuration values ncv_ext' effective, that is, in order to apply the updated extender network configuration value ncv_ext' to the whole operation of the first extender network device AP_ext_1, the action ACT' may be involved in the action ACT' of software and/or hardware of the first extender network device AP_ext_1. For different properties of the extender network configuration value ncv_ext', the scope of software and/or hardware operation involved in the action ACT' may be different. For example, the action ACT' may be a reboot operation on the extender network device. The action ACT' may also be a re-start operation on the network module of the extender network device, a re-start operation on a wireless transceiver module of the network module, or a re-start operation on an interface of the wireless transceiver.

In fact, the first extender network device AP_ext_1 in Step 208 individually compares whether the plurality of extender network configuration values ncv_ext are the same as the plurality of root network configuration value ncv_rt, the first extender network device AP_ext_1 may determine that the plurality of root network configuration values ncv_rt" are different from the plurality of extender network configuration values ncv_ext" corresponding to the root network configuration value ncv_rt", and obtains the plurality of action flags af" corresponding to the plurality of updated extender network configuration values ncv_ext", wherein the plurality of action flags af" are corresponding to the actions ACT" required for making to updating the extender network configuration values ncv_ext" effective. In this situation, the first extender network device AP_ext_1 would determine the scope of software and/or hardware involved in the plurality of actions ACT" according to the plurality of action flags af", and only execute the action ACT" involved in the widest scope in Step 212.

Figure 3:
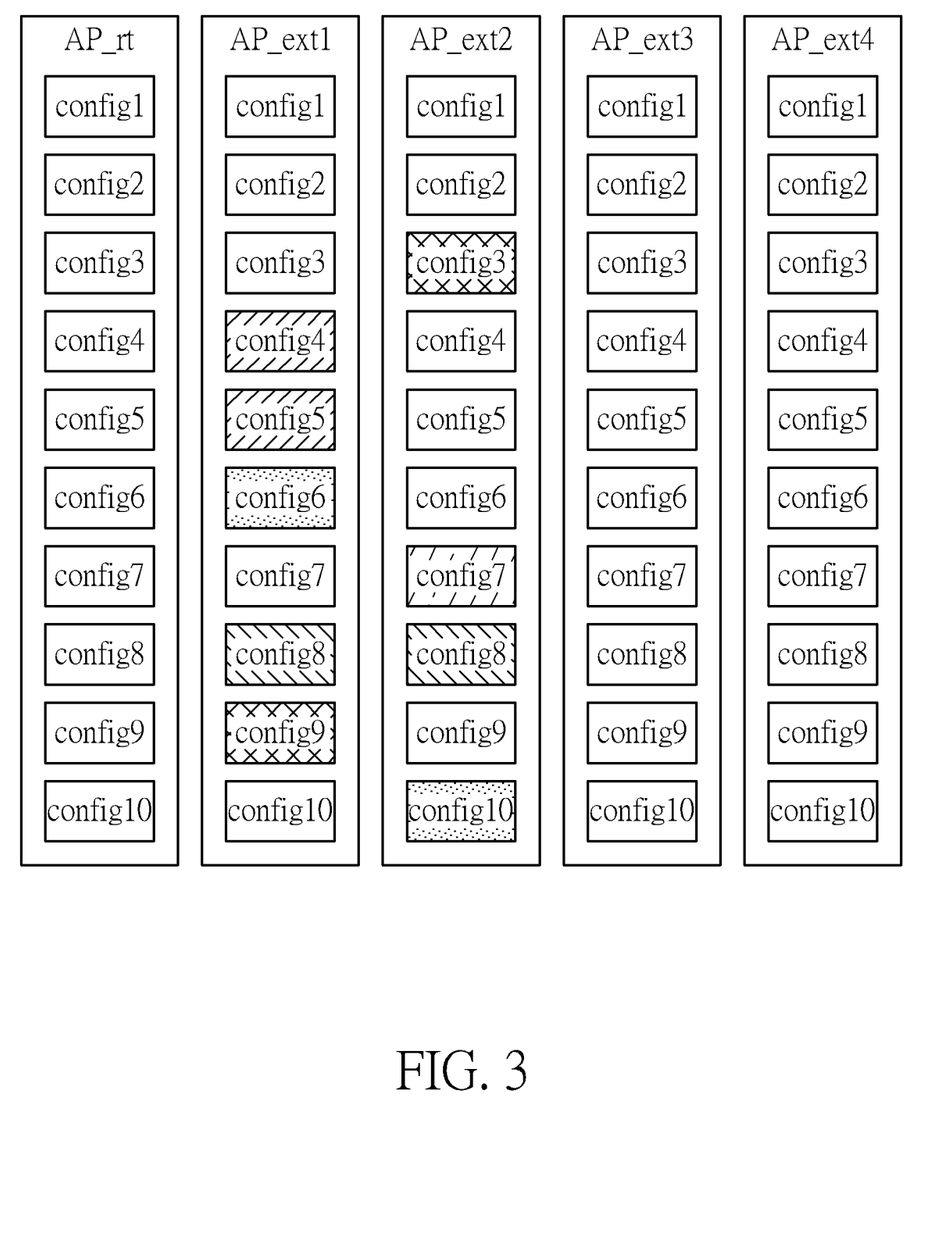
FIG. 3 illustrates a schematic diagram of a root network device and a plurality of network configuration values of a plurality of extender network devices.

For example, FIG. 3 illustrates a schematic diagram of the root network device AP_rt and a plurality of network configuration values config1-config10 of the extender network devices AP_ext1-AP_ext4, the first extender network device AP_ext_1 can be one of the extender network devices AP_ext1-AP_ext4. The network configuration values config1-config10 stored in the root network device AP_rt is the root network configuration value ncv_rt, and the network configuration values config1-config10 stored in the extender network devices AP_ext1-AP_ext4 is the extender network configuration value ncv_ext. If a configx block in the FIG. 3 is in the shadow, representing that the network configuration value and the root network device AP_rt are not synchronized or not consistent; Otherwise, if the configx block is not in the shadow, representing the network configuration value and the root network device AP_rt are synchronized or consistent. Wherein, the different types of shadows are corresponding to the different actions.

As shown in FIG. 3, the extender network devices AP_ext3, AP_ext4 and the network configuration values of the root network device AP_rt are synchronized or consistent, and the network configuration values config4, config5, config6, config8, and config9 of the extender network device AP_ext1 and the network configuration values of the root network device AP_rt are not consistent (such that the configuration synchronization process 20 needs to be executed to make the configuration values consistent), the network configuration values config3, config7, config8, and config10 of the extender network device AP_ext2 and the network configuration value of the root network device AP_rt are not consistent (such that the configuration synchronization process 20 needs to be executed to make the configuration values consistent). Executing an action ACT1 is required to make the updated network configuration values config4, and config5 effective in the extender network device. Executing an action ACT2 is required to make the updated network configuration values config3, and config9 effective in the extender network device. Executing an action ACT3 is required to make the updated network configuration values config6, and config10 effective in the extender network device. Executing an action ACT4 is required to make the updated network configuration value config8 effective in the extender network device. Executing an action ACT5 is required to make the updated network configuration value config7 effective in the extender network device.

In addition, in an embodiment, the action ACT4 may be a reboot operation the extender network device; the action ACT3 may be a re-start operation on the network module of the extender network device; the action ACT2 may be a re-start operation on the wireless transceiver module of the network module; the action ACT1 may be a re-start operation on the interface of the wireless transceiver module; and the action ACT5 may be an irrelative action to ACT1-ACT4.

In view of the scope of involvement, the scope of the action ACT4 is the widest; the scope of the action ACT3 is the second place; the scope of the action ACT2 is the next, and scope of the action ACT1 is the last. Moreover, the scope of the action ACT4 includes the scope of the action ACT3; the scope of the action ACT3 includes the scope of the action ACT2; the scope of the action ACT2 includes the scope of the action ACT1. In other words, if the extender network device needs to execute the action ACT4, then it represents that the extender network device also executes the action ACT1-ACT3.

That is, the extender network device AP_ext1 only needs to execute the action ACT4 to make the updated network configuration values config4, config5, config6, config8, and config9 effective, and the extender network device AP_ext2 only needs to execute the action ACT4 to make the updated network configuration values config3, config8, and config0 effective. In addition, the extender network device AP_ext2 needs to execute the action ACT5 to make the updated network configuration value config7 effective since the action ACT5 is irrelative to (or not compatible with) the action ACT1-ACT4.

In the following descriptions and claims, the actions ACT1-ACT4 are called being mutually inclusive or mutually inclusiveness.

In other words, go to Step 212, in Step 212, the first extender network device AP_ext_1 determines whether the plurality of actions ACT" are mutually inclusive according to the plurality of action flags af", when the first extender network device AP_ext_1 determines that the plurality of actions ACT" are mutually inclusive, the first extender network device AP_ext_1 can determine a most inclusive action ACT" _MMI in the actions ACT", the first extender network device AP_ext_1 executing the most inclusive action ACT" _MMI represents that the first extender network device AP_ext_1 also executes at least one other (the plurality of actions ACT" except the most inclusive action ACT" _MMI) action ACT" _RST. At this time, the first extender network device AP_ext_1 only needs to execute the most inclusive action ACT" _MMI to make the plurality of updated root network configuration value ncv_rt" effective. As shown in FIG. 3, the extender network device AP_ext1 can determine that the action ACT1-ACT4 are mutually inclusive, where the action ACT4 is the most inclusive action, and ACT1-ACT3 are the other action.

Besides, in an embodiment, the first extender network device AP_ext_1 can be a newly purchased or installed extender network device in the mesh network system 10, in Step 202_b, the first extender network device AP_ext_1 can transmit the extender configuration version number cvno_ext as the initial extender configuration version number (in Step 202_b) to the root network device AP_rt. Each of the extender configuration version numbers in the network devices is generated randomly (the network devices is set up in the factory). Therefore, the probability is very low that the initial extender configuration version number of the first extender network device AP_ext_1 is equal to the second root configuration version number cvno_rt_2, triggering the mesh network system 10 to execute Step 204_b, 206_b, 208, 210.

As shown above, the configuration synchronization process 20 uses the configuration version number cvno as a criterion for updating the plurality of extender network configuration values ncv_ext of the plurality of extender network devices AP_ext, and the network device AP_rt generates the new configuration version number cvno once the root network configuration value ncv_rt is modified. Moreover, the first extender network device AP_ext_1 periodically or non-periodically transmits the extender configuration version number cvno_ext to the root network device AP_rt. Therefore, the mesh network system 10 can be triggered to execute the configuration synchronization process 20 by the configuration version number cvno.

In another perspective, by setting the action flag af, the first extender network device AP_ext_1 can determine whether the plurality of actions ACT required for making to updating the extender network configuration value ncv_ext effective are mutually inclusive simultaneously. When the plurality of actions ACT are mutually inclusive, the most inclusive action ACT_MMI will be executed to reduce the unavailable time in which the wireless service is not provided due to executing the actions ACT.

Figure 4:
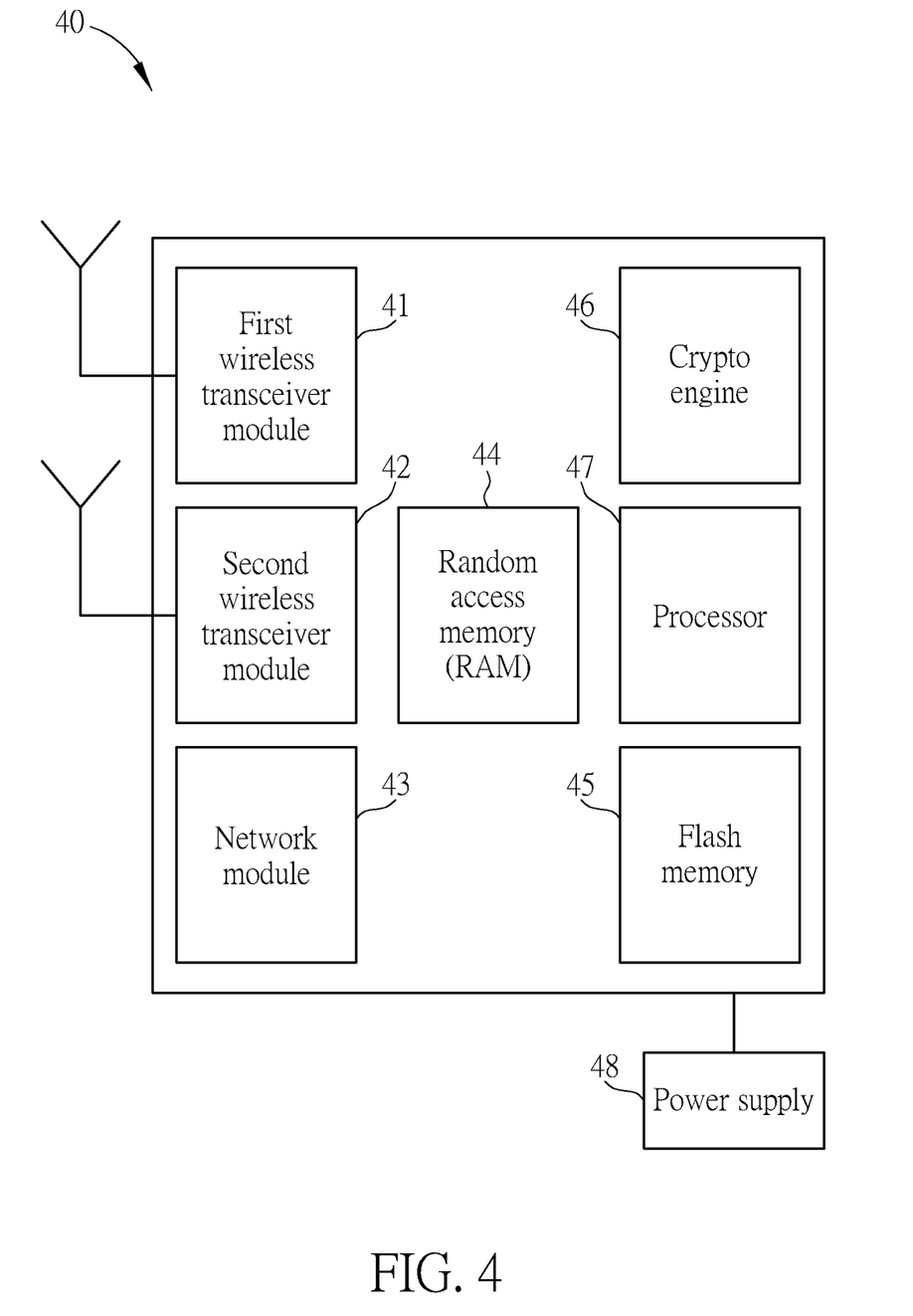
FIG. 4 is a schematic diagram of a network device according to an embodiment of the present invention

In addition, the hardware structures of the root network device and the extender network device are not limited. Please refer to FIG. 4, FIG. 4 is a schematic diagram of a network device 40 in an embodiment of the present invention, the network device 40 can be configured to implement the root network device AP_rt or the extender network device AP_ext. As shown in FIG. 4, the network device 40 comprises including a first wireless transceiver module 41 (such as a 5 GHz WiFi transceiver module), a second wireless transceiver module 42 (such as a 2.4 GHz WiFi transceiver module), a network module 43 (such as transceiving of Ethernet network data), a random access memory (RAM) 44, a flash memory 45, a crypto engine 46, a processor (such as CPU) 47 and a power supply 48, and not limited thereto.

In another perspective, the mesh network system 10 or the configuration synchronization process 20 may apply to the pairing of the root network device AP_rt with the (newly purchased) extender network device AP_ext. In an embodiment; the extender network device AP_ext can connect to the root network device AP_rt via Ethernet over twisted pair, the root network device AP_rt can transmit the network configuration value ncv_rt (such as SSID/Key) to the extender network device AP_ext via Ethernet over twisted pair; the extender network device AP_ext can execute the configuration synchronization process 20, so as to synchronize with the root network device AP_rt. In an embodiment, a user can input a fronthaul credential SSID/Key of the root network device AP_rt in the extender network device AP_ext, and the extender network device AP_ext makes a fronthaul connection to the network device AP_rt and executes the configuration synchronization process 20, so as to synchronize with the root network device AP_rt. Therefore, the configuration synchronization process 20 may apply to the pairing of the network devices, without a traditional WiFi protected setup (WPS) button.

In summary, the configuration version number is used to a criterion for configuration synchronization of the present invention, executing the configuration synchronization process once the configuration version number not synchronized. In addition, the mutual inclusiveness of the plurality of actions required for making to updating the extender network configuration value effective can be also determined of the present invention, when the actions are mutually inclusive, the most inclusive action needs to be executed reduce the unavailable time in which the wireless service is not provided due to executing the action.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A configuration synchronization method, applied to a mesh network system, wherein the mesh network system comprises a root network device and at least one extender network devices, the root network device has a plurality of root network configuration values, a first extender network device of the at least one extender network devices has a plurality of extender network configuration values, the configuration synchronization method comprising:

the first extender network device transmitting an extender configuration version number to the root network device;

the root network device determining whether the extender configuration version number is the same as a second root configuration version number currently owned by the root network device;

when the root network device determines that the extender configuration version number is different from the second root configuration version number, the root network device transmitting the second root configuration version number and the plurality of root network configuration values corresponding to the second root configuration version number to the first extender network device;

the first extender network device updating the plurality of extender network configuration values thereof according to the plurality of root network configuration values corresponding to the second root configuration version number, so as to make the plurality of extender network configuration values be the same as the plurality of root network configuration values;

the first extender network device updating the extender configuration version number to be the second root configuration version number;

the root network device receiving at least one first root network configuration value inputted by a user via an interface, and generating a first root configuration version number;

the root network device transmitting the at least one first root network configuration value and the first root configuration version number to the at least one extender network devices;

the first extender network device updating the extender network configuration value thereof according to the at least one first root network configuration value, so as to make the plurality of extender network configuration values be the same as the plurality of root network configuration values; and the first extender network device updating the extender configuration version number to be the first root configuration version number.

2. The configuration synchronization method of claim 1, wherein the extender configuration version number is an initial extender configuration version number.

3. The configuration synchronization method of claim 1, comprising:

the first extender network device individually comparing whether the plurality of extender network configuration values and the plurality of root network configuration values are the same;

when the first extender network device determines that a third root network configuration value is different from a third extender network configuration value corresponding to the third root network configuration value, the first extender network device updating the third extender network configuration value to be the third root network configuration value.

4. The configuration synchronization method of claim 3, comprising:

when the first extender network device determines that the third root network configuration value is different from the third extender network configuration value, obtaining an action flag corresponding to the third extender network configuration value, wherein the action flag is corresponding to an action required for making the updated third extender network configuration value be effective; and the first extender network device executing the action, such that the updated third extender network configuration value is effective.

5. The configuration synchronization method of claim 1, comprising:

the first extender network device individually comparing whether the plurality of extender network configuration values and the plurality of root network configuration values are the same;

when the first extender network device determines that a plurality of fourth root network configuration values are different from a plurality of fourth extender network configuration values, the first extender network device updating the plurality of fourth extender network configuration values to be the plurality of fourth root network configuration values.

6. The configuration synchronization method of claim 5, comprising:

when the first extender network device determines that the plurality of fourth root network configuration values are different from the plurality of fourth extender network configuration values, obtaining a plurality of action flags corresponding to the plurality of fourth extender network configuration values, wherein the plurality of action flags are corresponding to a plurality of actions required for making the plurality of fourth extender network configuration values be effective;

the first extender network device determining whether the plurality of actions are mutually compatible according to the plurality of action flags;

when the plurality of actions are mutually compatible, the first extender network device obtaining a most compatible action from the plurality of actions, wherein executing the most compatible action represents that at least one action of the plurality of actions other than the most compatible action is also executed; and the first extender network device executing the most compatible action, so as to make the plurality of updated fourth extender network configuration values be effective.

7. The configuration synchronization method of claim 6, comprising:
- the first extender network device determining that a first action is not compatible with at least one action of the plurality of actions other than the first action; and
- the first extender network device executing the first action, so as to make an extender network configuration value corresponding to the first action effective.

8. A mesh network system, comprising:
- at least one extender network device, having a plurality of extender network configuration values;
- a root network device, having a plurality of root network configuration values;
- wherein the mesh network system is configured to perform the following steps:
  - a first extender network device transmitting an extender configuration version number to the root network device;
  - the root network device comparing whether the extender configuration version number is the same as a second root configuration version number owned currently by the root network device;
  - when the root network device determines that the extender configuration version number is different from the second root configuration version number, the root network device transmitting the second root configuration version number and the plurality of root network configuration values corresponding to the second root configuration version number to the first extender network device;
  - the first extender network device updating the plurality of extender network configuration values thereof according to the plurality of root network configuration values corresponding to the second root configuration version number, so as to make the plurality of extender network configuration values be the same as the plurality of root network configuration values; and
  - the first extender network device updating the extender configuration version number to be the second root configuration version number;
  - the root network device receiving at least one first root network configuration value inputted by a user via an interface, and generating a first root configuration version number;
  - the root network device transmitting the at least one first root network configuration value and the first root configuration version number to the at least one extender network device;
  - the first extender network device updating the extender network configuration value thereof according to the at least one first root network configuration value, so as to make the plurality of extender network configuration values be the same as the plurality of root network configuration values; and
  - the first extender network device updating the extender configuration version number to be the first root configuration version number.

9. The mesh network system of claim 8, wherein the extender configuration version number is an initial extender configuration version number.

10. The mesh network system of claim 8, wherein the mesh network system is configured to perform the following steps:
- the first extender network device comparing the consistency of values between the plurality of extender network configuration values and the plurality of root network configuration values;
- when the first extender network device determines that a third root network configuration value is different from a third extender network configuration value corresponding to the third root network configuration values, the first extender network device updating the third extender network configuration value to be the third root network configuration value.

11. The mesh network system of claim 10, wherein the mesh network system is configured to perform the following steps:
- when the first extender network device determines that the third root network configuration value is different from the third extender network configuration value, obtaining an action flag corresponding to the third extender network configuration value, wherein the action flag is corresponding to an action required for making the updated the third extender network configuration value be effective; and
- the first extender network device executing the action, such that the updated third extender network configuration value is effective.

12. The mesh network system of claim 8, wherein the mesh network system is configured to perform the following steps:
- the first extender network device individually comparing whether the plurality of extender network configuration values and the plurality of root network configuration values are the same;
- when the first extender network device determines that a plurality of fourth root network configuration values are different from a plurality of fourth extender network configuration values, the first extender network device updating the plurality of fourth extender network configuration values to be the plurality of fourth root network configuration values.

13. The mesh network system of claim 12, wherein the mesh network system is configured to perform the following steps:
- when the first extender network device determines that the plurality of fourth root network configuration values are different from the plurality of fourth extender network configuration values, obtaining a plurality of action flags corresponding to the plurality of fourth extender network configuration values, wherein the plurality of action flags are corresponding to a plurality of actions required for making the plurality of fourth extender network configuration values be effective;
- the first extender network device determining whether the plurality of actions are mutually compatible;
- when the plurality of actions are mutually compatible, the first extender network device obtaining a most compatible action from the plurality of actions, wherein executing the most compatible action represents that at least one actions of the plurality of actions other than the most compatible action is also executed; and
- the first extender network device executing the most compatible action, so as to make the plurality of updated fourth extender network configuration values is effective.

14. The mesh network system of claim 13, wherein the mesh network system is configured to perform the following steps:
- the first extender network device determining that a first action is not compatible with at least one actions of the plurality of actions other than the first action; and the first extender network device executing the first action, so as to make an extender network configuration value corresponding to the first action effective.

\* \* \* \* \*